United States Patent [19]
Maguire

[11] Patent Number: 5,611,377
[45] Date of Patent: Mar. 18, 1997

[54] FUEL FILTER DRAINER

[76] Inventor: John R. Maguire, 181 Old Wendell Rd., Northfield, Mass. 01360

[21] Appl. No.: 496,923

[22] Filed: Jun. 30, 1995

[51] Int. Cl.$^6$ .................... B65B 1/04; B65B 3/04
[52] U.S. Cl. .................... 141/98; 141/106; 141/364; 184/106; 220/572
[58] Field of Search .................... 141/98, 106, 86–88, 141/231, 332, 364, 383, 386; 184/106; 248/94; 206/223; 220/572, 573, 501, DIG. 6

[56] References Cited

U.S. PATENT DOCUMENTS

| | | |
|---|---|---|
| Re. 32,458 | 7/1987 | Delay, Jr. . |
| 423,740 | 3/1890 | Coons et al. .................... 220/572 |
| 483,664 | 10/1892 | Aborn . |
| 1,798,387 | 3/1931 | Taylor .................... 220/572 |
| 2,250,910 | 7/1941 | Hiett .................... 141/106 |
| 4,098,398 | 7/1978 | Meyers .................... 206/223 |
| 4,114,660 | 9/1978 | Arruda . |
| 4,235,264 | 11/1980 | Rau et al. .................... 141/231 |
| 4,274,645 | 6/1981 | Ferguson et al. .................... 184/106 |
| 4,533,042 | 8/1985 | Pollacco . |
| 4,638,841 | 1/1987 | Heath .................... 141/98 |
| 4,823,947 | 4/1989 | Maynard, Jr. . |
| 4,832,095 | 5/1989 | Bonnell .................... 141/106 |
| 4,974,647 | 12/1990 | Eastom . |
| 5,172,739 | 12/1992 | Ristroph . |
| 5,360,039 | 11/1994 | Verrilli . |
| 5,505,295 | 4/1996 | Whittington .................... 220/572 |

*Primary Examiner*—David J. Walczak
*Assistant Examiner*—Steven O. Douglas
*Attorney, Agent, or Firm*—Richard H. Kosakowski, Esq.; Holland & Bonzagni, P.C.

[57] ABSTRACT

A device for facilitating the draining of residual oil or fuel remaining in an oil or fuel filter is disclosed. The device includes an outer container or bucket having an inner basket disposed at least partially therewithin. The basket has a ribbed or screened surface that holds the oil or fuel filters and allows the fuel to drain from the filter and through the ribbed or screened surface down to a bottom of the outer container. The basket may include a lower sloping surface with an opening formed therein. Oil draining from an oil furnace filter strikes the lower sloping surface and is directed to pass through the opening down to the bottom of the outer container. When the basket is entirely disposed within the outer container, a cover closes the opening at the top of the outer container to prevent spillage of any accumulated oil in the outer container therefrom during transportation of the device in a vehicle.

17 Claims, 3 Drawing Sheets

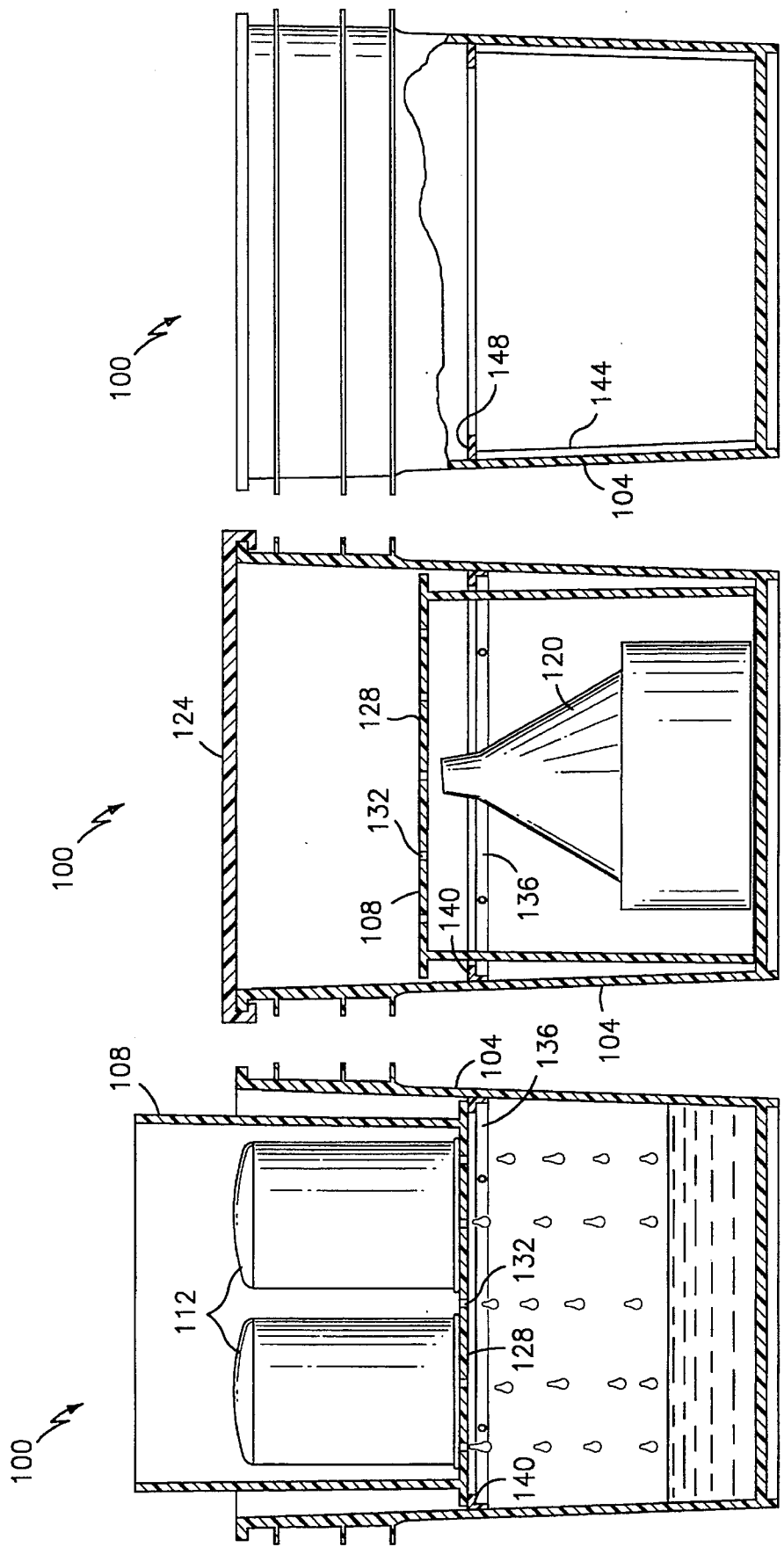

FUEL FILTER DRAINER

BACKGROUND OF THE INVENTION

This invention relates to fuel filters and more particularly to a device for draining residue oil or fuel remaining in a filter after the filter has been removed from, e.g., a gasoline pump or an oil furnace, in preparation for proper disposal of the filter and the oil or fuel drained therefrom.

Gas stations that sell gasoline to the public usually contain one or more "islands" having one or more banks of gas pumps that the motorist maneuvers his or her car proximate to. Each bank of gas pumps may be "double-sided" (that is, with a plurality of pumps on each opposing side) so cars can pull up along both sides of the pump bank. Further, each side of the pump bank may contain two or more pumps, one for each grade of gasoline sold. A typical pump bank contains six pumps, three on each side.

Typically, each pump within a bank of pumps contains a canister-like fuel filter located inside the bank. The filters are usually readily accessible upon removing a panel on the bank. The filter is operable to filter out impurities in the gasoline prior to the gasoline being pumped by the consumer from the underground storage tank into the automobile gas tank.

These filters need to be periodically replaced as, over time, the impurities collected by the filter add up to a point where the normal flow of gas through the filter is impeded. The filters are accessed by removing the panels on the pump bank and unscrewing the filters. Each filter may contain one pint or more of residue gasoline, which must be properly drained from the filter prior to proper disposal of the drained filter in accordance with ever-stricter environmental laws regulating the disposal of such filters.

In the prior art, it is known to use a large bucket (e.g., a five gallon bucket), open at the top. The filters are removed from a bank of pumps and the filters are either held by hand within the bucket and allowed to drain individually, or the filters are placed into the bucket among the accumulated fuel and left unattended to eventually drain. The first method is time consuming in that the person must hold the filter until most, if not all, of the fuel remaining in each filter has drained into the bucket. The time spent waiting for each filter to drain is inefficient and can add up. The problem is exacerbated by the fact that a typical gas station may contain 24 or more individual pumps and corresponding filters. The second method is problematic in that the person must eventually "fish out" the filters from the bucket, typically by hand. Regardless of the method used, the accumulated fuel must be poured into an appropriate container, often times the underground storage tank for the gasoline itself.

In another situation, an oil furnace for a residence typically has a single filter that filters out impurities in the oil prior to combustion. Similar to the gas station filters discussed previously, the oil filter must be periodically changed. However, the oil filter presents a different environment for changing the filter as compared to gas pump filters.

For example, as mentioned before, a typical gas station may have 24 or more filters that must be changed at one time. In contrast, a home oil furnace usually has only one filter to be changed. Also, the gas station itself provides a readily available site for disposal of collected fuel (the underground fuel tank). In contrast, most often there is no place to properly dispose of the residue oil collected from an oil furnace filter. Typically, the collected oil and furnace filter must be transported from the home to a proper site for disposal, such as a hazardous waste storage area. Thus, problems of possible spillage during vehicle transportation of the oil must be addressed.

Accordingly, it is a primary object of the present invention to provide a device that holds fuel filters so that they can be drained of any remaining fuel or oil without having the filter immersed in an accumulated residue oil or fuel.

It is a general object of the present invention to provide a coverable bucket-type device for holding fuel filters for draining any remaining fuel or oil from the filters while transporting the filters and without any spillage of the accumulated oil or fuel from the device.

It is another object of the present invention to provide an inexpensive device for holding one or more filters and for quickly draining any fuel or oil remaining therein, and for facilitating the pouring of accumulated oil or fuel in the device into a proper receptacle.

It is still another object of the present invention to provide an inexpensive and portable device for holding one or more filters and for quickly draining any fuel or oil remaining therein, all of the components of the device being stored in a compact manner when not in use.

It is yet another object of the present invention to provide a device that facilitates the collection of fuel or oil drained from filters at one site and for transporting the accumulated fuel or oil and the removed filters for disposal at another site.

It is still another object of the present invention to provide a device that facilitates the collection of fuel or oil drained from filters without spillage that could contaminate the environment.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicant has invented a device for draining residual fuel or oil in one or more filters.

According to a first aspect of the present invention, the device is utilized for draining fuel from a plurality of gasoline pump filters. The device includes an outer container or bucket, a basket, a funnel and a cover. In use, the basket is turned upside down and disposed inside the outer container such that a perforated screen surface of the basket is inside the outer container. In a preferred embodiment, the edge or lip of the perforated surface rests on a corresponding lip or edge within the outer container. The plurality of fuel filters are then placed on the screen and the fuel drains out of the filters by gravity and flows into the lower portion of the outer container. After draining, the filters may be discarded and the fuel accumulated in the lower container may be poured out of the container using the funnel. When not in use, the funnel is placed in the outer container, the basket is placed over the funnel in the outer container, and the cover is fit onto the top of the outer container. This allows for compact storage of the device.

According to a second aspect of the present invention, the device is utilized for draining oil from an oil furnace filter, located in a residential oil furnace. The device includes an outer container or bucket, a basket and a cover. In use, the basket is disposed entirely within the outer container. One or more filters are disposed on a screened or ribbed surface and the residual oil within the filters is allowed to drain through the screened or ribbed surface and strike a sloping surface that directs the oil to and through a small opening in the sloping surface. The oil then drips down into the bottom of the outer container where it is collected. Once the filters are placed within the basket, the cover may be placed on the outer container to cover the top thereof to prevent spillage of the collected oil during transportation of the device in a vehicle.

BRIEF DESCRIPTION OF THE DRAWINGS

FIG. 1 is a cross-sectional view of a device, according to the present invention, having an outer container with an inner basket disposed at least partially therewithin, and also illustrates a plurality of canister-like fuel filters disposed within the inner basket and adapted to drain any residual fuel through perforations formed in a bottom surface of the inner basket;

FIG. 2 is a partial cross-sectional illustration of the outer container and the inner basket of FIG. 1, together with a funnel disposed within the outer container and a cover disposed over an opening at the top of the outer container, the device of FIG. 2 shown in a storage position;

FIG. 3 illustrates a front-view, partially cut-away, illustrating the outer container of FIG. 1 with an alternative embodiment of means, disposed within the container, for supporting the inner basket within the outer container;

DETAILED DESCRIPTION OF THE PREFERRED EMBODIMENTS

Figure 5:
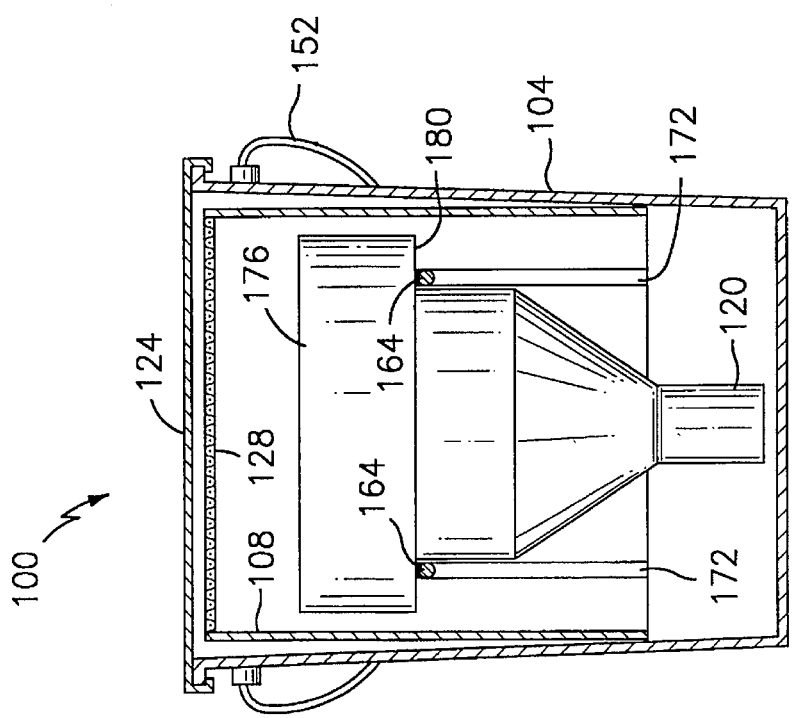
FIG. 5 illustrates the device of FIG. 4 in a storage position, including a funnel and a cover.

Referring to the drawings in detail, a device for facilitating the draining of oil or fluid remaining in a filter is illustrated therein and generally designated by the reference numeral 100. The device 100 generally includes an outer container or bucket 104, and an inner basket 108 disposed at least partially within the outer container when the device 100 is set up to drain the fluid from the filters 112, 116. Various types of means for holding the inner basket 108 in a predetermined position within the outer container 104 are also disclosed. During storage of the device 100, a funnel 120 is disposed within the outer container 104, the inner basket 108 is disposed entirely within the outer container, and a cover 124 is provided to cover an opening in the top of the outer container.

Referring now to FIG. 1, there illustrated is a first preferred embodiment of the device 100 of the present invention. The device 100 includes an outer container 104, cylindrical in shape, comprising plastic, metal or other suitable material. The outer container 104 is generally in the shape of a bucket having a closed bottom, a cylindrical sidewall, and an opening at the top.

An inner basket 108 is cylindrical in shape and has a bottom screened surface 128 with a plurality of perforations 132 formed therein. The top of the inner basket 108 has an opening to facilitate the placement of one or more canister-like fuel filters 112 within the inner basket and on the bottom screened surface 128 of the basket.

Means are provided for holding the inner basket in a predetermined position at least partially within the outer container. In the embodiment of FIG. 1, the means for holding comprises a metal or plastic ring 136 that is disposed at least part way around the inner surface of the outer container 104 and is attached thereto by way of, e.g., nuts/bolts or rivets. The means for holding the inner basket has a "lip" or upper ring surface 140 upon which the outer edges of the bottom surface 128 of the inner basket 108 rest on.

The device 100 of FIG. 1 is contemplated for use in draining residue fuel within a plurality of fuel filters 112 (in a preferred embodiment, six) removed from a bank of gasoline pumps at a gasoline station. The device 100 of the present invention has utility in quickly draining residue fuel in an unattended manner from the filters 112 to facilitate proper disposal of empty filters and fuel accumulated at the bottom of the outer container 104.

FIG. 2 illustrates the device 100 of FIG. 1 in a stored position. The inner basket 108 is illustrated inverted from the position shown in FIG. 1, such that the inner basket is now disposed entirely within the outer container 104. A funnel 120 is disposed entirely within the outer container 104 at the bottom thereof. The funnel 120 facilitates the pouring of the fluid accumulated in the bottom of the outer container into a proper disposal tank. For example, for use of the device 100 of the present invention in conjunction with fuel oil at a gasoline station, the funnel 120 may facilitate the pouring of the accumulated gasoline into the underground gasoline storage tank at the gasoline station. A cover 124 is provided to cover the opening at the top of the outer container 104. Thus, FIG. 2 illustrates four primary components of the device of FIG. 1 in an assembled, compact storage position.

FIG. 3 illustrates the outer container 104 of FIG. 1, together with an alternative embodiment of the means for holding the inner basket 108 in a predetermined position within the outer container. In contrast to the means illustrated in FIG. 1, the means illustrated in FIG. 3 comprises a cylindrical-shaped inner support 144 disposed within the outer container 104 and resting on the bottom surface thereof. The inner support 144 has an upper ring surface 148 upon which the bottom surface 128 of the inner basket 108 can rest. The ring surface 148 of the inner support comprises a "lip" that extends partly toward the center of the inside of the outer container 104. A suitable opening is provided within the inner support 144 so as not to impede the flow of fluid draining from the filters 112 through the perforations 132 in the bottom surface 128 of the inner basket 108.

In this alternative embodiment of the means for holding the inner basket 108, the inner support 144 may be unattached to the inner surface of the outer container 104. In such case, the inner support 144 is sized to fit snugly with respect to the inner surface of the outer container 104. Alternatively, the inner support 144 may be physically attached to the outer container 104 by suitable fastening means, such as nuts/bolts, rivets, welds, etc.

Figure 4:
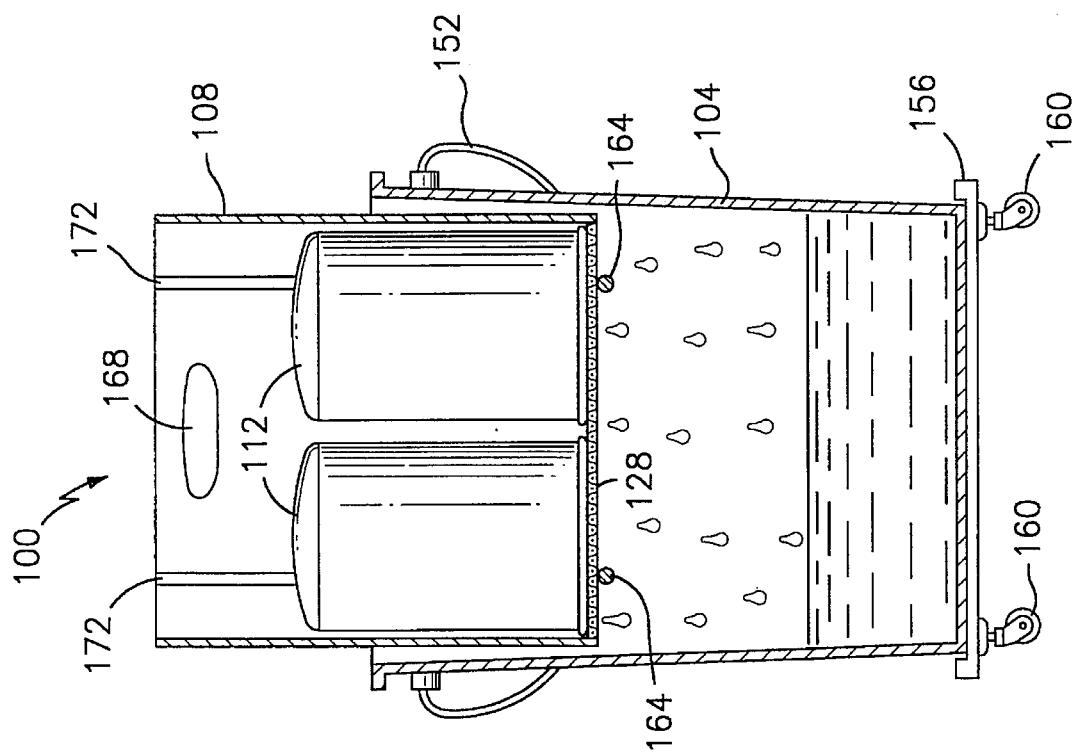
FIG. 4 illustrates an alternative embodiment of the outer container of FIG. 1 having a handle and a plurality of wheels, together with an alternative embodiment of the inner basket of FIG. 1 and an alternative embodiment of the means for supporting the inner basket within the outer container.

Referring now to FIG. 4, there illustrated is yet another alternative embodiment of the device 100 of the present invention. The container 104 has a handle 152 formed integrally therewith. Also shown attached to a bottom surface of the outer container 104 is a platform 156 having a plurality of wheels 160 to facilitate moving the device 100 around the area of use. For example, it is contemplated that the device 100 of the present invention may be utilized at a public gasoline station having a plurality of gasoline pumps located at various "islands" disposed over a rather large area. The handle 152 and wheels 160 allow the device 100 of the present invention to be easily moved to the desired locations at which the fuel filters 112 are located, especially as the device 100 becomes heavier due to additional fuel accumulated in the outer container 104. On the other hand, it is also contemplated that the device 100 of the present invention may be utilized within an airplane hangar or an automobile service garage, such installations having articles utilizing fuel filters that must be periodically drained utilizing the device 100 of the present invention.

In contrast to the earlier embodiments disclosed hereinbefore, the outer container 104 illustrated in FIG. 4 has a pair of cross-members 164, illustrated in cross-section, spanning a portion or all of the distance across the inside of the outer container 104. For example, if the outer container 104 comprises a steel material, the cross-members 164 may also be steel or other metal material and are welded at appropriate locations to the inner surface of the outer container 104. In a preferred embodiment, two cross-members 164 are provided, each cross-member being attached at both ends to appropriate locations on the inner surface of the outer container 104. The two cross-members 164 are arranged with a predetermined height above the bottom of the outer container 104 to support the bottom surface 128 of the inner basket 108 when the inner basket is placed thereon, as illustrated in FIG. 4.

The inner basket 108 of FIG. 4 also has a handle 168 formed in the wall of the basket near the top cylindrical opening thereof. The basket 108 also has appropriate slotted openings 172 formed therein to facilitate the storage of the basket 108 within the outer container 104, as illustrated in FIG. 5. That is, when the basket 108 is to be stored entirely within the outer container 104, the slotted openings 172 formed in the wall of the inner basket 108 slide over the two cross-members 164 within the outer container 104. Also, as can be seen from FIG. 5, this type of means for holding the inner basket 108 may require the funnel 120 of FIG. 2 to be shaped somewhat differently therefrom, in order to fit properly within the outer container 104 for storage. For example, an upper portion 176 of the funnel 120 has a lower flanged surface 180 that rests on the cross members 164. Also illustrated in FIG. 5 is a cover 124 for covering the cylindrical opening in the top of the cylindrical-shaped outer container 104 for storage of the device 100.

Figures 8, 9:
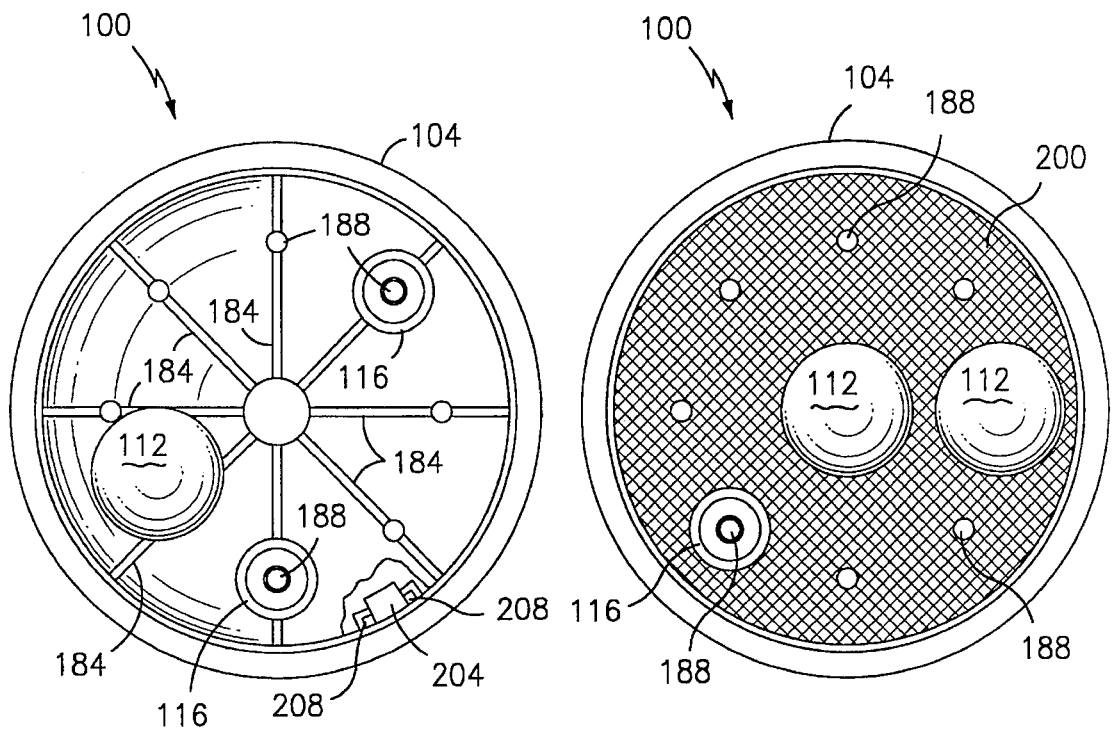
FIG. 8 is a top view, partially cut-away, of the device of FIG. 6.
FIG. 9 is a top view of the device of FIG. 7.
Figures 6, 7:
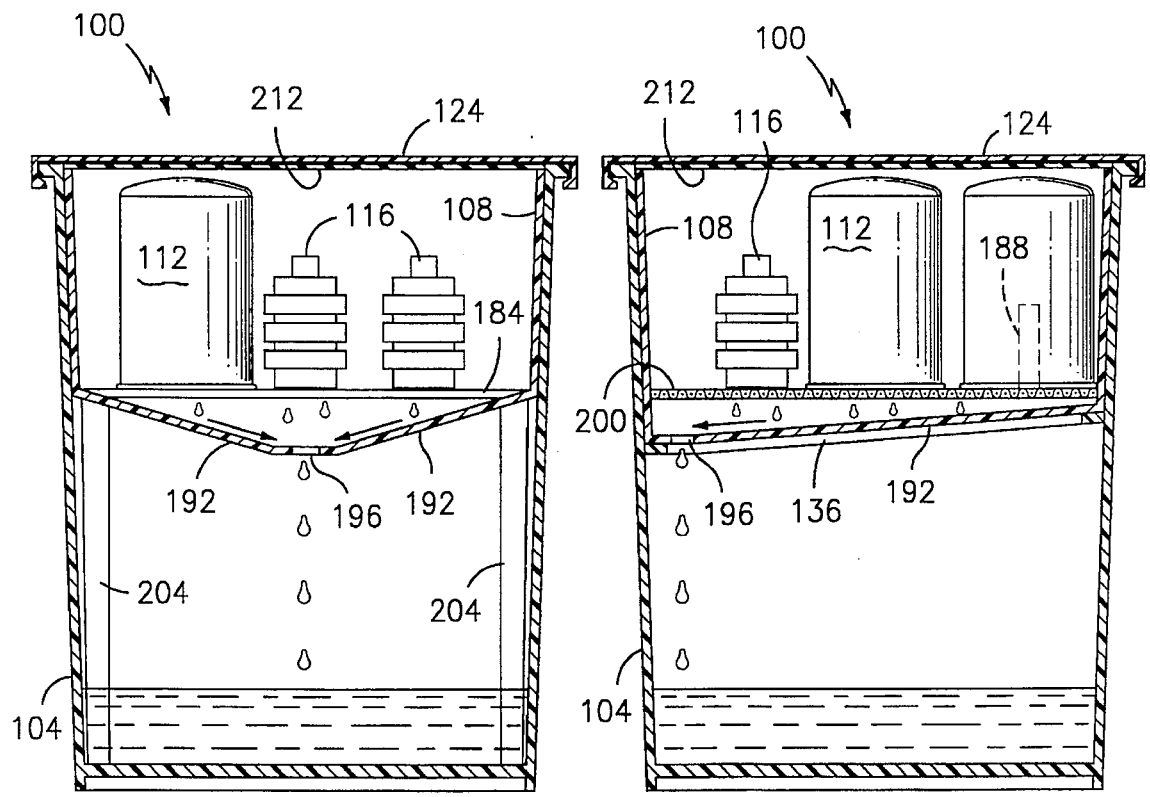
FIG. 6 is a cross-sectional illustration of an alternative embodiment of the device of FIG. 1, having an inner basket adapted to support various types of fuel and/or oil filters for draining into the outer container.
FIG. 7 is a cross-sectional illustration of the device of FIG. 6, and an alternative embodiment of the basket of FIG. 6, together with an alternative embodiment of means for supporting the basket.

Referring now to FIG. 6, there illustrated is an alternative embodiment of the device 100 of the present invention for use in, e.g., draining oil from a filter 116 removed from a furnace located in a residence. Also, FIG. 8 illustrates a top view, partially cut-away, of the alternative embodiment of the device 100 of FIG. 6. The device 100 comprises a cylindrical-shaped outer container 104. The device 100 also includes a cylindrical-shaped inner basket 108 disposed entirely within the outer container 104, in contrast to the previous devices 100 described and illustrated in FIGS. 1–5. Preferably (although not absolutely required), it is desired that the cylindrical outer surface of the inner basket 108 abut the inner surface of the outer container 104. This reduces the ability of the oil accumulated at the bottom of the outer container 104 to "splash" back up and out of the container. In this alternative embodiment, it is desired to have the basket 108 disposed entirely within the outer container 104 since, typically, the person utilizing the device 100 will travel from residence to residence replacing an old furnace filter 112, 116 with a new furnace filter. The user of the device 100 must have some way of placing the removed filter 112, 116 within the inner basket 108, then placing a cover 124 over the outer container 104, and then traveling to the next residence to perform another replacement procedure. During the time that the person utilizing the device 100 of FIG. 6 is travelling, the filters 112, 116 located within the inner basket 108 are allowed to drain. To prevent spillage of the oil accumulated in the bottom of the outer container 104 (e.g., in case the device 100 tips over in the vehicle), a cover 124 is provided to cover the opening in the top of the outer container.

In a preferred embodiment, the inner basket 108 has a plurality of horizontally-located ribs 184 connected between a central point or "hub" at the center of the inner basket 108 and at predetermined locations proximate the outer surface of the inner basket. As illustrated in FIG. 8, these ribs 184 provide means for supporting canister-like oil filters 112 to allow the oil remaining therein to drain through the spacing between the ribs 184. Also illustrated in FIG. 8 are the ribs 184 having at least one protrusion 188 emanating upward from each rib. These protrusions 188 facilitate the placement of the typical circular-shaped, felt filters 116 found in modern residence oil furnaces. That is, the filters 116 have a central opening located therewithin which is placed over the protrusion 188 of the rib 184 to better hold the filter 116 within the device 100. Alternatively, the central opening in a canister-like oil filter 112 may also be disposed over and onto the protrusion 188 on the rib 184.

Oil draining from either type of filter 112, 116 passes between the openings in the ribs 184 and then strikes a sloping surface 192 located at the bottom of the inner basket 108. As illustrated in FIG. 6, the oil is then directed toward a relatively small diameter opening 196 formed, e.g., in the center of the lower sloping surface 192 of the inner basket 108. In the alternative, FIG. 7 illustrates the situation where the opening 196 in the lower sloping surface 192 of the inner basket 108 is off to the side of the inner basket, near the inner surface of the outer container 104. The relatively small circular opening 196 reduces the chance that the accumulated oil at the bottom of the outer container 104 will "splash" back up at the filters 112, 116 or even to the top of the inner basket 108.

FIG. 9 illustrates an alternative embodiment where, instead of utilizing ribs 184, a screened surface 200 having a plurality of perforations to allow oil to drain down therethrough is provided. The screened surface 200 may also have a plurality of protrusions 188 located thereon, in a similar manner to the ribs 184 of FIG. 8.

Referring also to FIG. 6, a plurality of legs 204 are illustrated as comprising the means for supporting the inner basket 108 within the outer container 104. A bottom portion of each leg 204 is disposed on the bottom surface of the outer container 104, while the upper portion of each leg 204 supports the bottom of the lower sloping surface 192 of the inner basket 108. The legs 204 may either be free standing within the outer container 104, or they may be formed integral with the inner surface of the outer container, or they may be attached utilizing suitable fasteners to the inner surface of the outer container. FIG. 8 illustrates one embodiment where the legs 204 are formed unattached to the inner basket 108, and clips 208 or other suitable means are provided for "gripping" the sides of each leg 204 to facilitate proper placement of the legs 204 within the outer container 104. This "gripping" means 208 may be formed on the bottom of the lower sloping surface 192 of the inner basket 108. In the alternative, the legs 204 may be formed integral with the inner basket 108.

Also, FIGS. 6 and 7 illustrate a cover 124 disposed over the top cylindrical opening of the outer container 104. The cover 124 has either attached thereto, or formed integrally therewith, an inner lid 212 that protrudes downward from the upper edge of the outer container 104. The lid 212 may comprise rubber or other suitable material. Its purpose is to provide a high-integrity seal at the top of the outer container 104 to prevent any accumulated oil at the bottom of the container from spilling out of the container during transportation of the device 100 of the present invention. Preferably, the rubber lid 212 is of a height such that the bottom of the lid 212 abuts the top of the inner basket 108 to provide the tight interface.

The device 100 of the present invention has been described as being embodied in several preferred embodiments with a number of different features specific to certain embodiments. However, it should be understood that certain features, such as the handle 152 and wheels 160 provided for the outer container 104, may be utilized with any or all of the embodiments disclosed herein, or equivalents thereof, in light of the teachings therein and without departing from the broadest scope of the present invention. That is, the device 100 of the present invention utilized for draining and transporting furnace filters may have a handle 152 and/or wheels 160 formed together with the outer container 104.

Further, the means for holding the inner basket 108 within the outer container 104 of the device 100 of the present invention utilized for draining gasoline from gasoline station fuel filters 112, 116 (illustrated in FIGS. 1–5) may utilize the legs 204 of FIG. 6 as the means for holding the inner basket 108 within the outer container 104. Further, the wheels 160 utilized for moving the device 100 of the present invention around a predetermined location are purely exemplary. Other means for moving the device, such as tracks or rails, can be utilized without departing from the broadest scope of the present invention.

The shape of the outer container 104 and inner basket 108 has been illustrated as being generally cylindrical. However, it should be understood that other shapes may be utilized and are contemplated by the broadest scope of the present invention. For example, the outer container 104 and/or the inner basket 108 may each or both comprise a square or multi-sided shape.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A device for facilitating the draining of fluid from at least one filter, the device comprising:

a. a bucket having a closed bottom, an open top and at least one side wall, the bucket being operable to hold fluid;

b. a basket disposed at least partially within the bucket, the basket having a lower surface with at least one perforation formed therein, the lower surface being operable to hold the at least one filter thereon, whereby when the at least one filter is disposed on the lower surface, any fluid in the filter drains through the at least one perforation and is collected at the closed bottom of the bucket;

c. means for holding the basket at least partially within the bucket, the means for holding the basket being operable to support a bottom surface of the basket to thereby hold the basket in a predetermined position with respect to the bucket; and d. a funnel adapted to be disposed within the bucket during storage of the device.

2. The device of claim 1, wherein the means for holding the basket comprises a ring surface disposed at least part way around an inner surface of the bucket, the basket being adapted to rest on the ring surface.

3. The device of claim 1, wherein the means for holding the basket comprises at least one leg.

4. The device of claim 3, wherein the at least one leg is attached to the basket.

5. The device of claim 3, wherein the at least one leg is attached to an inner surface of the bucket.

6. The device of claim 5, wherein the basket comprises means, attached to the basket, for connecting with at least one leg.

7. The device of claim 1, wherein the means for holding the basket comprises at least one cross member connected to at least one location on an inner surface of the bucket.

8. The device of claim 1, wherein the means for holding the basket comprises an inner support disposed within the bucket, the inner support including an upper surface operable to support the basket.

9. The device of claim 1, further comprising a cover operable to integrally connect with and cover entirely an opening in the bucket when the basket is disposed entirely within the bucket.

10. The device of claim 1, wherein the lower surface of the basket comprises a screen connected with the basket and having perforations formed therein, any fluid remaining in the filter being operable to pass through at least one of the perforations in the screen.

11. The device of claim 1, wherein the lower surface of the basket includes at least one protrusion upon which at least one filter is adapted to be disposed.

12. The device of claim 1, wherein the lower surface of the basket comprises at least one rib connected with the basket.

13. The device of claim 12, wherein the at least one rib includes at least one protrusion upon which at least one filter is adapted to be disposed.

14. The device of claim 1, wherein the lower surface of the basket comprises a plurality of ribs connectable with the basket and having a predetermined spacing therebetween wherein the filter is adapted to contact at least two ribs, any fluid remaining in the filter is adapted to pass through the predetermined spacing between the ribs.

15. The device of claim 1, wherein the basket has a lower sloping surface with an opening formed therein, any fluid from the filter adapted to drip down onto the lower sloping surface and pass through the opening formed in the sloping surface and drip down into the bucket.

16. The device of claim 1, further comprising means for moving the device.

17. The device of claim 16, wherein the means for moving comprises at least one wheel connected with a bottom surface of the bucket.

* * * * *